United States Patent
Weng et al.

(10) Patent No.: US 11,238,790 B2
(45) Date of Patent: Feb. 1, 2022

(54) METHOD FOR DRIVING DISPLAY WITH PIXEL UNITS IN ONE GROUP ARRANGED IN A SLANTED FORMATION

(71) Applicant: HON HAI PRECISION INDUSTRY CO., LTD., New Taipei (TW)

(72) Inventors: Yu-Fu Weng, New Taipei (TW); Chien-Wen Lin, New Taipei (TW); Tzu-Yu Cheng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/118,092

(22) Filed: Dec. 10, 2020

(65) Prior Publication Data
US 2021/0125552 A1 Apr. 29, 2021

Related U.S. Application Data

(62) Division of application No. 16/037,102, filed on Jul. 17, 2018, now Pat. No. 10,896,639.

(30) Foreign Application Priority Data

May 11, 2018 (CN) .................. 201810450321.X

(51) Int. Cl.
*G09G 3/3225* (2016.01)
*G06F 3/041* (2006.01)
*G09G 3/3266* (2016.01)

(52) U.S. Cl.
CPC .......... *G09G 3/3225* (2013.01); *G06F 3/0412* (2013.01); *G06F 3/0416* (2013.01); *G09G 3/3266* (2013.01); *G09G 2300/0413* (2013.01)

(58) Field of Classification Search
None
See application file for complete search history.

(56) References Cited

U.S. PATENT DOCUMENTS

| 2011/0169787 | A1  | 7/2011  | Chen et al. |
| 2015/0325593 | A1  | 11/2015 | Shih et al. |
| 2016/0125793 | A1  | 5/2016  | Kim et al. |
| 2017/0168620 | A1* | 6/2017  | Gim ...................... G06F 3/0412 |
| 2018/0107075 | A1  | 4/2018  | Chang |
| 2018/0275827 | A1* | 9/2018  | Lin ...................... G06F 3/04184 |

FOREIGN PATENT DOCUMENTS

TW 201102727 A1 1/2011

* cited by examiner

*Primary Examiner* — Brian M Butcher
(74) *Attorney, Agent, or Firm* — ScienBiziP, P.C.

(57) ABSTRACT

A method for driving a high-frequency display applied in a display apparatus with a border of reduced size selects one horizontal scan line for scanning during a selecting period. The signals of the selected horizontal scan line and two following horizontal lines adjacent to the selected horizontal scan line are made effective during a first sub-period. The signals of the selected horizontal scan line and a following horizontal scan line adjacent to the selected horizontal scan line are made effective during a second sub-period following. The signals of the selected horizontal scan line are made effective during a third sub-period following the second.

9 Claims, 7 Drawing Sheets

METHOD FOR DRIVING DISPLAY WITH PIXEL UNITS IN ONE GROUP ARRANGED IN A SLANTED FORMATION

FIELD

The present disclosure relates to a display driving method.

BACKGROUND

Liquid crystal display apparatuses and organic electroluminescent (EL) display apparatuses are widespread. These display apparatuses defines a display region and a non-display region surrounding the display region. The display region includes a plurality of scan lines and a plurality of data lines. The scan lines are crossed with data lines to define a plurality of pixel units. The non-display region includes a gate driver for driving the scan lines, a source driver for driving the data lines, and a time controller for driving the gate driver and the source driver. The gate driver and the source driver are located on opposite edges of the non-display region based on the arrangement of the scan lines and the data lines, such as a left edge and a bottom edge. The time controller is further located in the bottom edge. Due to a larger size of the display device with a high frequency driving, the number of the scan lines and the data lines is increased, which cause an area of the non-display region Achieving a narrow screen border on such devices is problematic.

BRIEF DESCRIPTION OF THE FIGURES

Implementations of the present technology will now be described, by way of example only, with reference to the attached figures.

DETAILED DESCRIPTION

Figure 1:
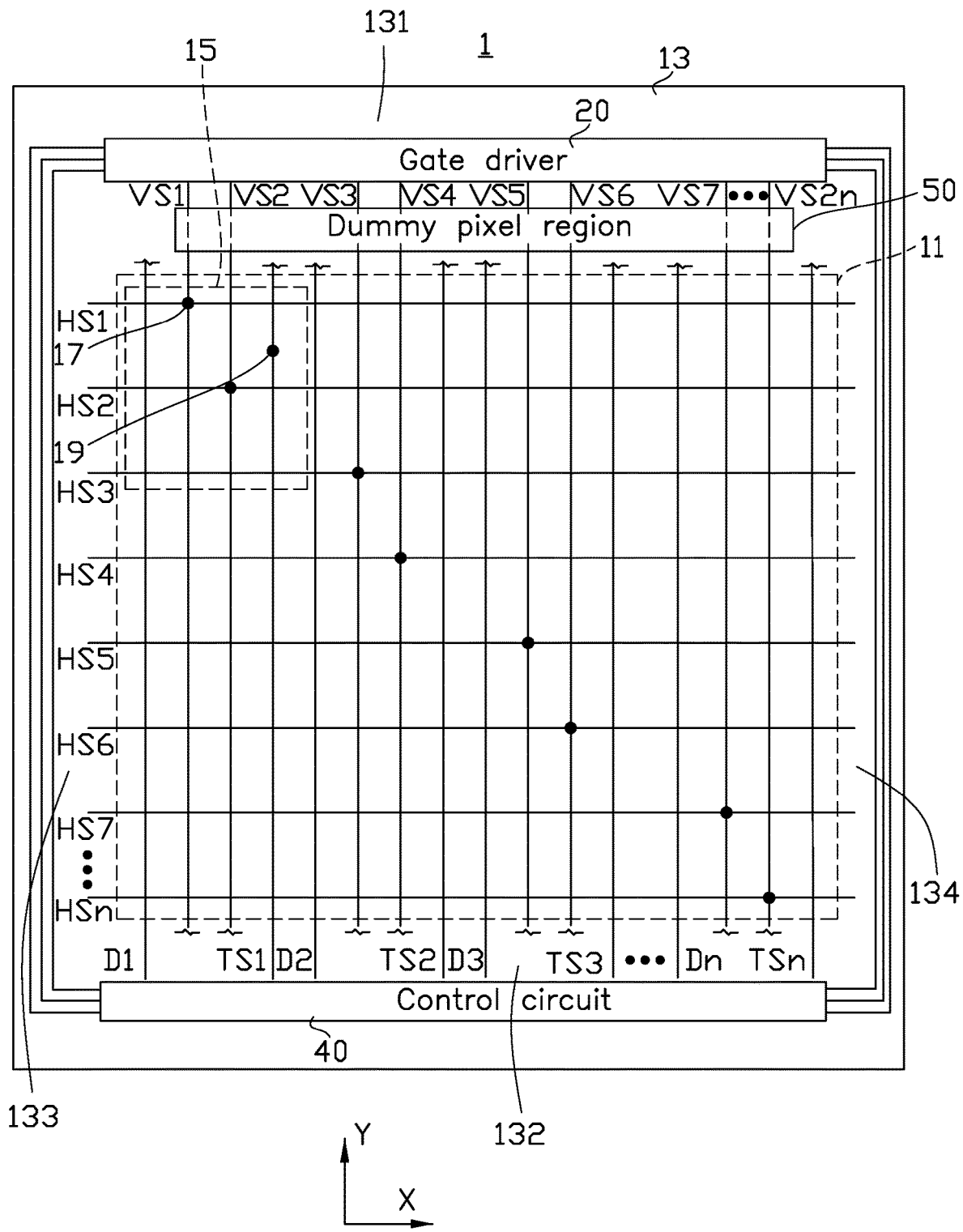
FIG. 1 is a diagrammatic view of an embodiment of a display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one." The term "circuit" is defined as an integrated circuit (IC) with a plurality of electric elements, such as capacitors, resistors, amplifiers, and the like.

The present disclosure provides a high-frequency display apparatus with a narrow border. The display apparatus includes a plurality of pixel units arranged in a matrix. Each pixel unit includes a driving transistor. The display apparatus defines a display region and a non-display region surrounding the display region. The display region includes a plurality of horizontal scan lines and a plurality of data lines. The horizontal scan lines are parallel with each along a first direction, and the data lines are parallel with each other along a second direction. A pixel group is defined by at least three pixel units. In a same pixel group, the pixel units along the first direction are arranged on different columns, and arranged on different rows along the second direction. The driving transistors of the pixel units in the same pixel group are electrically connected to a same data line through connection lines.

In an embodiment, the non-display region includes an upper edge and a bottom edge opposite to the upper edge. A gate driver is located in the upper edge, and a control circuit is located in the bottom edge.

In an embodiment, the display region further includes a plurality of vertical scan lines along the second direction. The vertical scan lines are patterned out of a metal layer which is not the metal layer patterned to form the horizontal scan lines. The vertical scan lines are electrically connected to the horizontal scan lines through a first via hole for transmitting scan signals to the horizontal scan lines. Two vertical scan lines are arranged between two adjacent data lines.

In an embodiment, the display apparatus operates cyclically between display periods and touch periods. The display region further includes a plurality of touch sensing lines. The touch sensing lines, the data lines, and the vertical scan lines are patterned out of same metal layer. The touch sensing lines are parallel with data lines along the second direction. Each touch sensing line is arranged between two adjacent data lines. The touch sensing lines are used for transmitting touch sensing signals during the touch period.

In an embodiment, the non-display region further includes a dummy pixel region. The dummy pixel region cooperates with the pixel units in the display region to form pixel groups.

In an embodiment, a number of vertical scan lines is larger than a number of horizontal scan lines. The vertical scan lines are insulated from the horizontal scan lines and serve as the touch sensing lines for transmitting touch sensing signals.

In an embodiment, the display region includes a plurality of common electrodes. The common electrodes are arranged on a layer which is not the layer carrying the touch sensing lines. The touch sensing lines are electrically connected to the common electrodes through second via holes.

In an embodiment, the pixel group includes a first pixel unit, a second pixel unit, and a third pixel unit. In the same pixel group, a source electrode of the driving transistor in the first pixel unit is directly electrically connected to the corresponding data line. A source electrode of the driving transistor in the second pixel unit is electrically connected to a drain electrode of the driving transistor in the first pixel unit through the connection line, and a drain electrode of the driving transistor in the second pixel unit is electrically connected to a source electrode of the driving transistor in the third pixel unit.

In an embodiment, a driving method is provided for driving the display apparatus. A plurality of display periods and a plurality of touch periods are defined in one frame. Each display period further includes a plurality of selecting periods. One of the horizontal scan lines is selected for scanning during each selecting period. Each selecting period includes a first sub-period, a second sub-period, and a third sub-period. During the first sub-period, the gate driver sequentially selects one horizontal scan line, and activates and controls the signals of the selected horizontal scan line and two horizontal scan lines following the selected horizontal scan line to be effective, and further controls the reset signals of horizontal scan lines to be ineffective. During the second sub-period, the gate driver controls the signals of the selected horizontal scan line and the horizontal scan line following the selected horizontal scan line to be effective, and further controls the reset signals of horizontal scan lines to be ineffective. During the third sub-period, the gate driver controls the signal of the selected horizontal scan line to be effective, and further controls the reset signals of horizontal scan lines to be ineffective.

In an embodiment, the pixel group includes a first pixel unit, a second pixel unit, and a third pixel unit. In the same pixel group, a source electrode of the driving transistor in the first pixel unit is directly electrically connected to the corresponding data line. A source electrode of the driving transistor in the second pixel unit is electrically connected to a drain electrode of the driving transistor in the first pixel unit through the connection line, and a drain electrode of the driving transistor in the second pixel unit is electrically connected to a source electrode of the driving transistor in the third pixel unit.

In an embodiment, during the first sub-period, the third pixel unit connected to the selected horizontal scan line inputs signals on the corresponding data line. During the second sub-period, the second pixel unit connected to the selected horizontal scan line inputs signals on the corresponding data line. During the third sub-period, the first pixel unit connected to the selected horizontal scan line inputs signals on the corresponding data line.

FIG. 1 illustrates an embodiment of the display apparatus 1. The display apparatus 1 defines a display region 11 and a non-display region 13 surrounding the display region 11. The display region 11 includes a plurality of horizontal scan lines HS1-HSn, a plurality of vertical scan lines VS1-VS2n, a plurality of data lines D1-Dm, and a plurality of touch sensing lines TS1-TSn. In the embodiment, n and m are positive integers, and are each larger than 2. The horizontal scan lines HS1-HSn are parallel with each along a first direction X, the vertical scan lines VS1-VS2n and the data lines D1-Dm are parallel with each other along a second direction Y, Y being perpendicular to the first direction X. The horizontal scan lines HS1-HSn, the vertical scan lines VS1-VS2n, and the data lines D1-Dm are arranged as a grid to define a plurality of pixel units SP1-SPk at the crossed-line portions. In this embodiment, k is equal to n*(m+n). Each pixel unit SP1-SPk includes a light emitting element. In the embodiment, the light emitting element can be an organic light emitting diode (OLED). The light emitting element emits light so as to display images. The display apparatus 1 includes the light emitting elements for green light, for blue light, and for red light. The light emitting elements emitting different colors of light are arranged in different pixel units SP1-SPk. In another embodiment, the display apparatus 1 only includes light emitting element emitting white light, and further includes a color filter. In another embodiment, the light emitting elements emit a first color light in the display apparatus 1 which is transmitted by a quantum film to achieve output of light with a different colors. Two vertical scan lines VS(i−1)-VSi and one touch sensing line TSi are arranged between two adjacent data lines D(i−1)-Di, and the touch sensing line TSi is adjacent to the corresponding data line Di. The vertical scan lines VS1-VS2n are electrically connected to the horizontal scan lines HS1-HSn through a first via hole 17. In the embodiment, a conductive layer patterned to form the horizontal scan lines HS1-HSn is different from a conductive layer patterned to form each of the data lines D1-Dm, the vertical scan lines VS1-VS2n, and the touch sensing lines TS1-TSn. In the embodiment, the first via hole 17 can be a through hole plating disposed in the display apparatus 1.

The non-display region 13 includes an upper edge 131, a bottom edge 132, a left edge 133, and a right edge 134. The upper edge 131 is opposite to the bottom edge 132, and the left edge 133 is opposite to the right edge 134. The upper edge 131, the bottom edge 132, the left edge 133, and the right edge 134 cooperate with each other to form a frame around the display region 11. The non-display region 13 further includes a gate driver 20 and a control circuit 40. The gate driver 20 is located in the upper edge 131, and the control circuit 40 is located in the bottom edge 132. The control circuit 40 has functions of a source driver and a time controller. Each pixel unit SPi is electrically connected to the gate driver 20 through a horizontal scan line HSi, and the vertical scan line VSi is connected with the horizontal scan line HSi. An electrical connection to the control circuit 40 is through a data line Di. The control circuit 40 provides various control signals for driving the gate driver 20. The various control signals may include a vertical synchronization (Vsync) signal, a horizontal synchronization (Hsync) signal, a clock (CLK) signal, and a data enable (DE) signal, not being limited thereto. The control circuit 40 further provides data signals to the data lines D1-Dm for inputting data signals to the pixel units SP1-SPk. The control circuit 40 further provides touch sensing signals to the touch sensing lines TS1-TSn. In this embodiment, the gate driver 20 and the control circuit 40 are formed on a chip-on-glass (COG) through a tape-automated bonding manner, or formed on a display panel through a gate-in-panel (GIP) manner. In other embodiments, the gate driver 20 and the control circuit 40 are embedded in the display panel.

Figure 2:
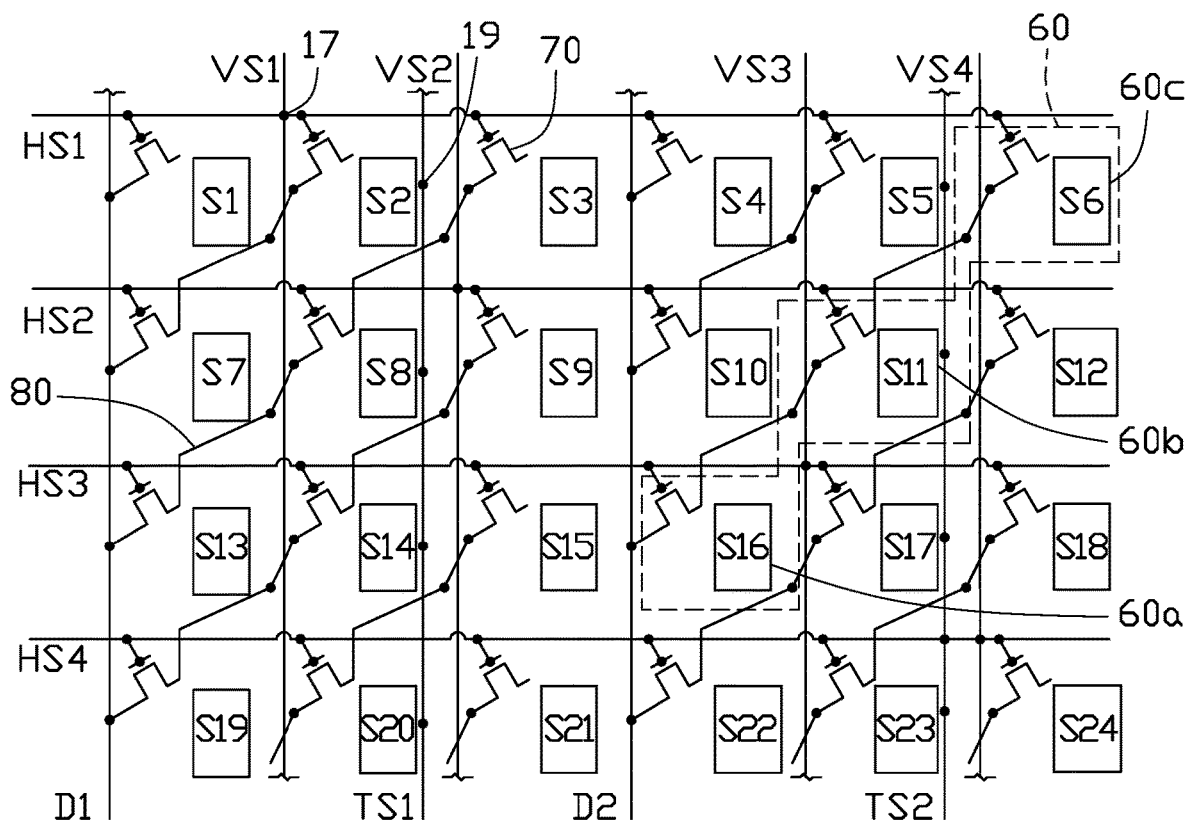
FIG. 2 is a circuit diagram view of a first embodiment of the display apparatus of FIG. 1.

A dummy pixel region 50 is defined at the upper edge 131 or the bottom edge 132 by the patterning of a conductive layer. The dummy pixel region 50 is disabled from displaying images. In the embodiment, the dummy pixel region 50 is insulated from the horizontal scan lines HS1-HSn, the vertical scan lines VS1-VS2n, and the data lines D1-Dm. The dummy pixel region 50 defines a plurality of dummy pixel units (not shown). The structure of the dummy pixel units is the same as the pixel units SP1-SPk, and the dummy pixel units cooperate with the pixel units in the display region 11 to form pixel groups 60 (as shown in FIG. 2). In this embodiment, the dummy pixel region 50 is located between the gate driver 20 and the display region 11. In other embodiments, the dummy pixel region 50 is disposed between the control circuit 40 and the display region 11. In another embodiment, two dummy pixel regions 50 are disposed, one is disposed between the gate driver 20 and the display region 11, and the other is disposed between the control circuit 40 and the display region 11.

The display apparatus 1 further includes a plurality of common electrodes 15 arranged in a matrix. FIG. 1 shows only one common electrode 15 (represented by broken lines). The common electrodes 15 are electrically connected to the touch sensing lines TS1-TSn through a second via hole 19. In this embodiment, the common electrodes 15 are disposed on a layer which is not the layer in which the touch sensing lines TS1-TSn are disposed. In the embodiment, the first via hole 17 can be a plating through hole disposed in the display apparatus 1. Each common electrode 15 overlaps with at least two pixel units 10. In this embodiment, the common electrode 15 overlaps with two pixel units 10. In other embodiments, more than two pixel units 10 correspond to one common electrode 15.

FIG. 2 illustrates a circuit diagram of part of the display apparatus 1. FIG. 2 only shows four vertical scan lines VS1-VS4, four horizontal scan lines HS1-HS4, two data lines D1-D2, and two touch sensing lines TS1-TS2. The four vertical scan lines VS1-VS4, the four horizontal scan lines HS1-HS4, and the two data lines D1-D2 define twenty four pixel units, SP1-SP24. Each pixel unit SPi includes a driving transistor 70. In this embodiment, the pixel units SP1-SP24 can emit blue, green, red, or white light. Gate electrodes of the driving transistors 70 are electrically connected to the horizontal scan lines. The gate electrodes of the driving transistors 70 in one row are electrically connected to a same horizontal scan line HSi. The display apparatus 1 further defines a plurality of pixel groups 60. Each pixel group 60 includes a first pixel unit 60a, a second pixel unit 60b, and a third pixel unit 60c. In other embodiments, each pixel group 60 can further include at least one fourth pixel unit or other pixel unit. In a same pixel group 60, the first pixel unit 60a, the second pixel unit 60b, and the third pixel unit 60c are adjacent to each other, and are aligned obliquely. In a same pixel group 60, the first pixel unit 60a, the second pixel unit 60b and the third pixel unit 60c are surrounded by three adjacent horizontal scan lines HSi-HS(i+3), two vertical scan lines VSi-VS(i+2), and a data line Di. In a same pixel group 60, the first pixel unit 60a, the second pixel unit 60b, and the third pixel unit 60c are disposed in three adjacent columns, and are further disposed in three adjacent rows. In a same pixel group 60, the first pixel unit 60a, the second pixel unit 60b, and the third pixel unit 60c in a same pixel group 60 emit light of same color. In same pixel group 60, the first pixel unit 60a, the second pixel unit 60b, and the third pixel unit 60c are electrically connected to the same data line Di. In same pixel group 60, a source electrode of the driving transistor 70 in the first pixel unit 60a is directly electrically connected to the corresponding data line Di, and a drain electrode of the driving transistor 70 in the first pixel unit 60a is electrically connected to a source electrode of the driving transistor 70 in the second pixel unit 60b, through a connection line 80. A drain electrode of the driving transistor 70 in the second pixel unit 60b is electrically connected to a source electrode of the driving transistor 70 in the third pixel unit 60c through a connection line 80. Thus, by the manner of arrangement, the source electrode of the driving transistor 70 in the third pixel unit 60c is electrically connected to the drain electrode of the driving transistor 70 in the second pixel unit 60b located at a lower oblique direction through the connection line 80. The source electrode of the driving transistor 70 in the second pixel unit 60b is electrically connected to the drain electrode of the driving transistor 70 in the first pixel unit 60a located at a lower oblique direction, through the connection line 80. For example, one of the pixel group 60 includes the pixel unit SP6 as the third pixel unit 60c, the pixel unit SP11 as the second pixel unit 60b, and the pixel unit SP16 as the first pixel unit 60a. The source electrode of the driving transistor 70 in the pixel unit SP16 is directly electrically connected to the corresponding data line D2, and the drain electrode of the driving transistor 70 in the pixel unit SP 16 is electrically connected to the source electrode of the pixel unit SP11 through the connection line 80. The drain electrode of the driving transistor 70 in the pixel unit SP11 is electrically connected to the source electrode of the driving transistor 70 in the pixel unit SP6 through the connection line 80. In this embodiment, the pixel unit SP2 and the pixel unit SP7 cooperate with the dummy pixel unit in the dummy pixel region 50 to form a pixel group 60, the pixel unit SP5 and the pixel unit SP10 cooperate with the dummy pixel unit in the dummy pixel region 50 to form a pixel group 60, the pixel unit SP1 cooperates with the dummy pixel unit in the dummy pixel region 50 to form a pixel group 60, and the pixel unit SP4 cooperates with the dummy pixel unit in the dummy pixel region 50 to form a pixel group 60.

Based on this structure, three pixel units in one same pixel group are electrically connected to the same data line, thus a number of the data lines is reduced. The touch sensing lines, the vertical scan lines, and the data lines are patterned from a same layer, thus masks used in the fabricating process are reduced. The gate driver and control circuit are located on opposite edges, to allow a narrowing of the border of the display apparatus.

Figure 3:
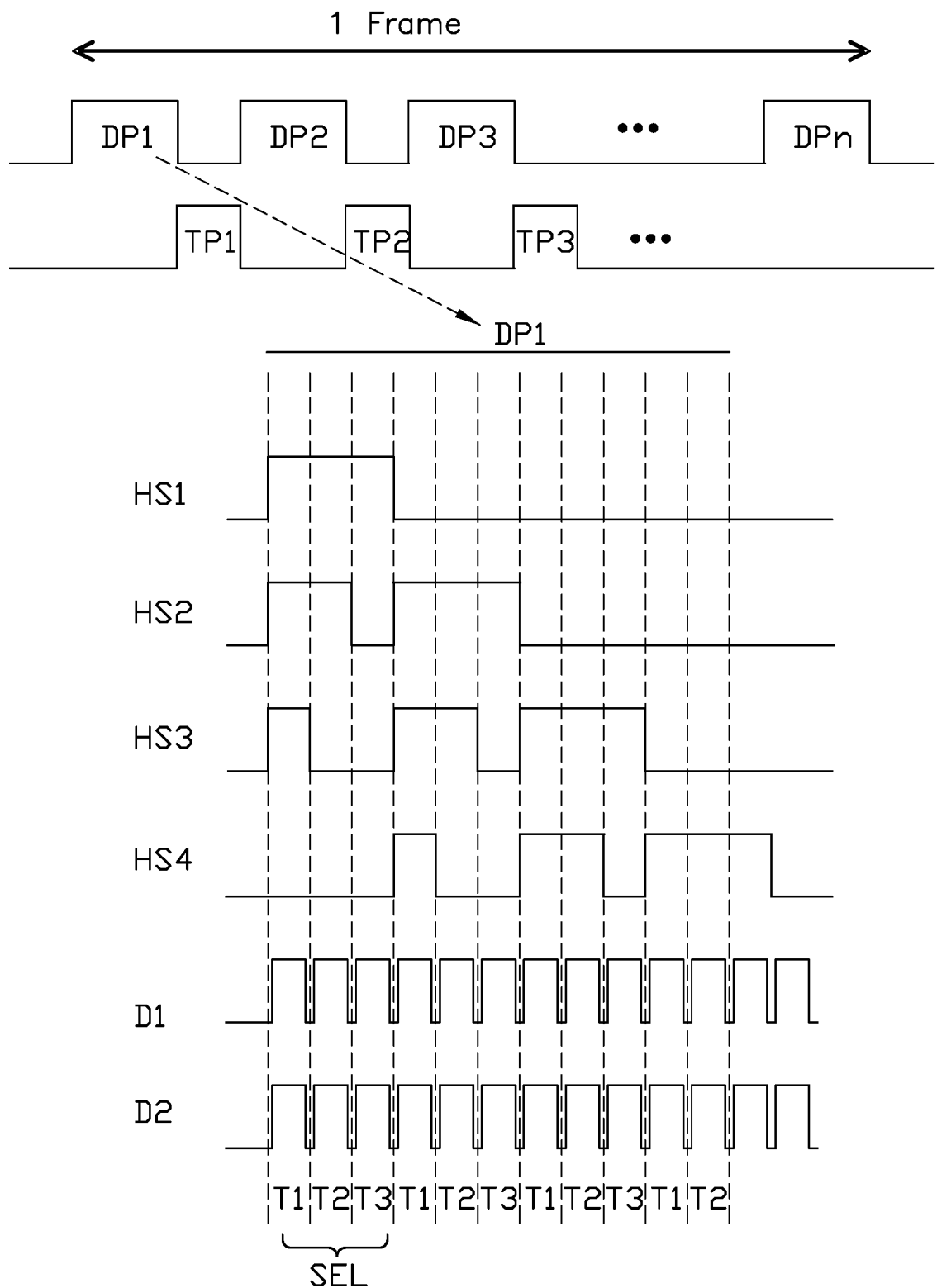
FIG. 3 is a timing chart showing waveforms of the display apparatus of FIG. 1.

FIG. 3 illustrates waveforms of the display apparatus 1. In one frame, a plurality of the display periods DP-DPn and a plurality of touch sensing periods TP1-TPn are operated. Each of the touch sensing periods TP-TPn is inserted between two adjacent display periods DPi-DP(i+1). During the display period DP1-DPn, the data lines D1-Dm loads data signals. The display period DP1-DPn further includes a plurality of selecting periods SEL. During the selecting period, the horizontal scan line HSi in the horizontal scan lines HS1-HSn is selected for orderly loading of data signals on the pixel units SPi-SP(i+m), which are electrically connected to the selected horizontal scan line HSi. Each selecting period SEL includes a first sub-period T1, a second sub-period T2, and a third sub-period T3. In other embodiments, the number of the sub-periods can be adjusted due to the number of the pixel units SPi-SP(i+j) in one pixel group 60. During the first sub-period T1, the second sub-period T2, and the third sub-period T3, the data signals on the data lines D1-Dm can be the same or different. During the first sub-period T1, the gate driver 20 controls the signals on the selected horizontal scan line HSi and two following adjacent horizontal scan lines HS(i+1)-HS(i+2) to be effective (such as high level voltage), and the signals on the other horizontal scan lines HS1-HS(i−1), HS(i+3)-HSn to be ineffective (such as low level voltage). Thus, the data signals on the data lines D1-Dm are loaded on the pixel groups 60 connected to the horizontal scan lines HSi-HS(i+2), and the data signals of the third pixel units 60c directly connected to the selecting horizontal scan line HSi are locked due to the connected data lines D1-Dm. During the second sub-period T2, the gate driver 20 controls the signals on the selected horizontal scan line HSi and the following horizontal scan line HS(i+1) to be effective, and the signals on the other horizontal scan lines HS1-HS(i−1), HS(i+2)-HS(n) to be ineffective. Thus, the data signals on the data lines D1-Dm are loaded on the pixel group 60 connected to the selected horizontal scan line HSi, and the data signals of the second pixel units 60b directly connected to the selecting horizontal scan line HSi are locked due to the connected data lines D1-Dm. During the third sub-period T3, the gate driver 20 controls the signal on the selected horizontal scan line HSi to be effective, and the signals on the other horizontal scan lines HS1-HS(i−1), HS(i+1)-HS(n) to be ineffective. Thus, the data signals on the data lines D1-Dm are loaded on the pixel group 60 connected to the horizontal scan line HSi, and the data signals of the first pixel unit 60a directly connected to the selected horizontal scan line HSi are locked due to the connected data lines D1-Dm.

Figure 4:
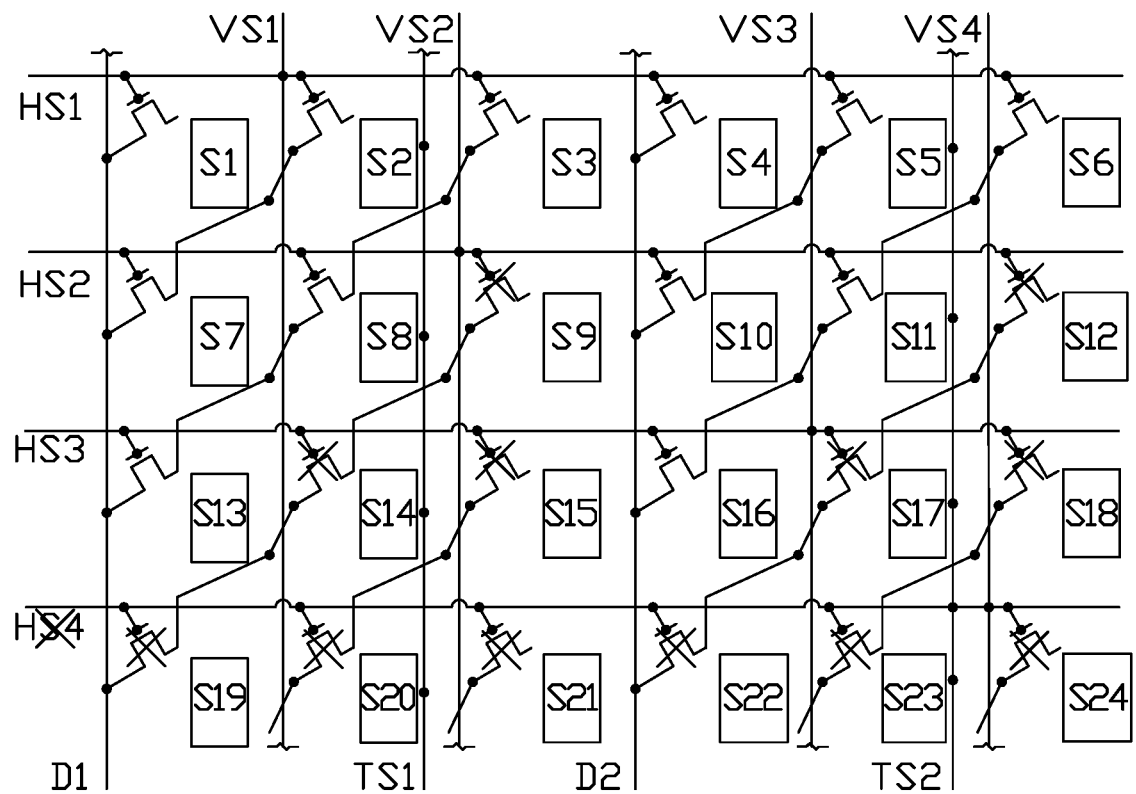
FIG. 4 is a circuit diagram of the display apparatus of FIG. 1 in a first sub-period, the elements marked "X" being turned-off.

FIG. 4 illustrates the display apparatus 1 of FIG. 2 in the first sub-period T1. During the first sub-period T1, the gate driving 20 controls the signals on the selected horizontal scan line HS1 and the following horizontal scan lines HS2-HS3 to be effective, and the signal of the other horizontal scan line HS4 to be ineffective. The driving transistors 70 corresponding to the pixel units SP1-SP8, SP10-SP11, SP13, and SP16 are turned on for loading the data signals on the data lines D1-D2. The pixel unit SP3 serving as the third pixel unit 60c is locked due to the current data signal on the data line D1 through the transistors 60 corresponding to the pixel unit SP13 and the pixel unit SP8, being in the same pixel group 60. The pixel unit SP6 serving as the third pixel unit 60c is locked due to the current data signal on the data line D2 through the transistors 60 corresponding to the pixel unit SP16 and the pixel unit SP11, these being in the same pixel group 60.

Figure 5:
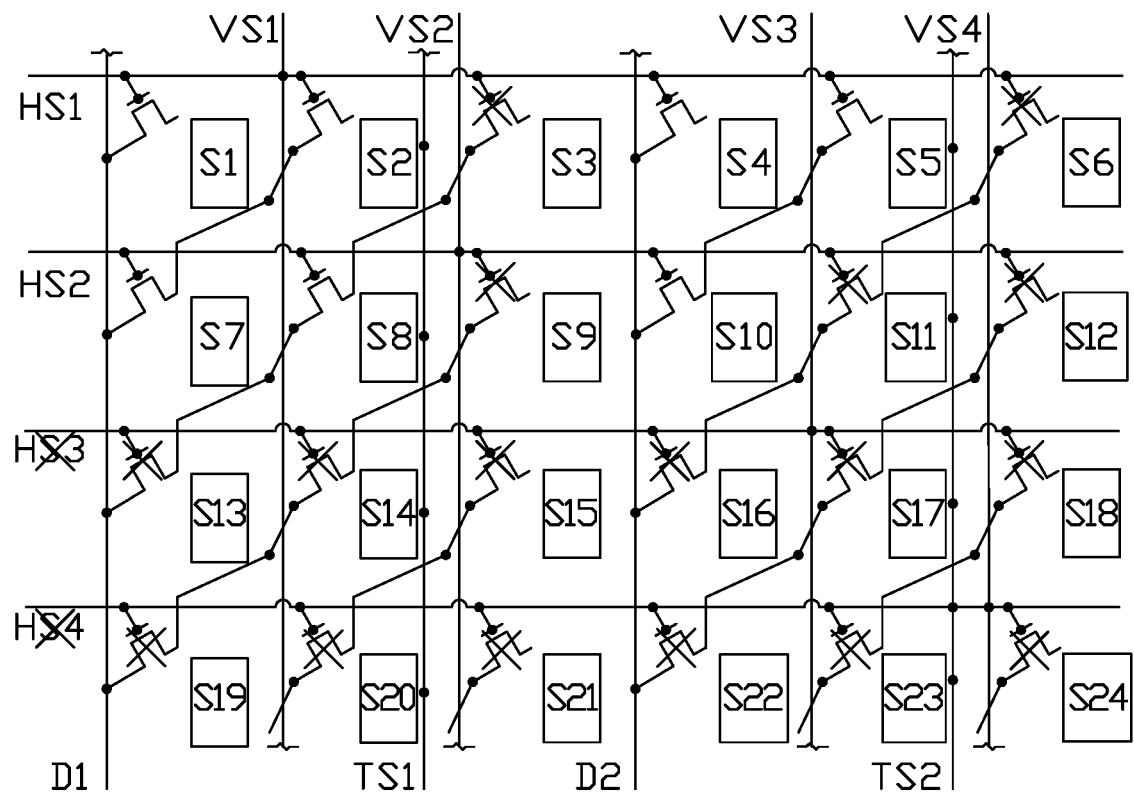
FIG. 5 is a circuit diagram of the display apparatus of FIG. 1 in a second sub-period, the elements marked "X" being turned-off.

FIG. 5 illustrates the display apparatus 1 of FIG. 2 in the second sub-period T2. During the second sub-period T2, the gate driving 20 controls the signals on the selected horizontal scan line HS1 and the following horizontal scan line HS2 to be effective, and the signals of the other horizontal scan lines HS3-HS4 to be ineffective. The driving transistors 70 corresponding to the pixel units SP1-SP2, SP4-SP5, SP7, and SP10 are turned on for loading the data signals on the data lines D1-D2. The pixel unit SP2 serving as the second pixel unit 60b is locked due to the current data signal on the data line D1 through the transistors 60 corresponding to the pixel unit SP12 and the pixel unit SP7, these being in the same pixel group 60. The pixel unit SP5 serving as the third pixel unit 60b is locked due to the current data signal on the data line D2, through the transistors 60 corresponding to the pixel unit SP15 and the pixel unit SP10, these being in the same pixel group 60.

Figure 6:
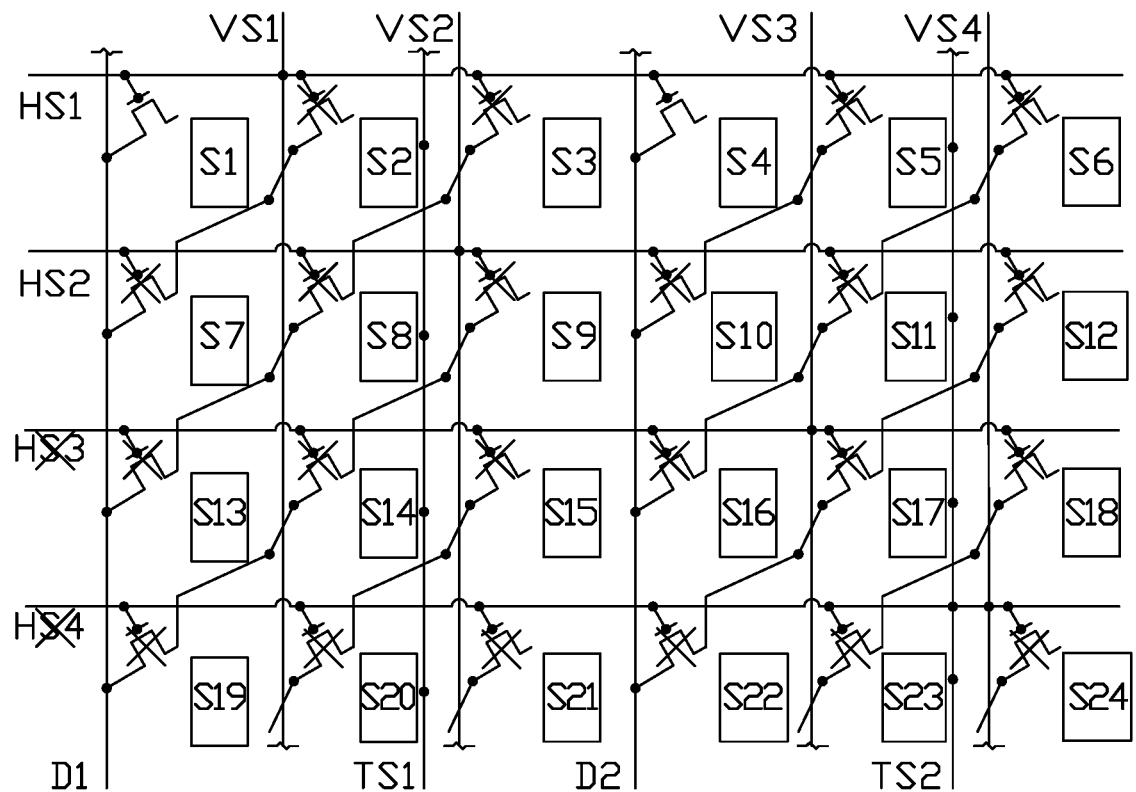
FIG. 6 is a circuit diagram of the display apparatus of FIG. 1 in a third sub-period, the elements marked "X" being turned-off.

FIG. 6 illustrates the display apparatus 1 of FIG. 2 in the third sub-period T3. During the third sub-period T3, the gate driving 20 controls the signal on the selected horizontal scan line HS1 to be effective, and the signals of the other horizontal scan lines HS2-HS4 to be ineffective. The driving transistors 70 corresponding to the pixel unit SP1 and SP4 are turned on for loading the data signals on the data lines D1-D2. The pixel unit SP1 serving as the first pixel unit 60a is locked due to the current data signal on the data line D1, and the pixel unit SP4 serving as the first pixel unit 60a is locked due to the current data signal on the data line D2.

During the selection of horizontal scan line HS2 by the gate driver 20, in the first sub-period T1, the gate driver 20 controls signals on the selected horizontal scan line HS2 and the following two adjacent scan lines HS3-HS4 to be effective, and the signal of the horizontal scan line HS1 to be ineffective. The pixel unit SP9 is thus locked due to the data signal of the data line D1, and the pixel unit SP12 is locked due to the data signal of the data line D2. During the second sub-period T2, the gate driver 20 controls the signals on the selected horizontal scan line HS2 and the following horizontal scan line HS3 to be effective, and the horizontal scan line HS1, and HS4 to be ineffective. The pixel unit SP8 is thus locked due to the data signal of the data line D1, and the pixel unit SP11 is locked due to the data signal of the data line D2. During the third sub-period T3, the gate driver 20 controls the selected horizontal scan line HS2 to be effective, and the horizontal scan lines HS1 and HS3-HS4 to be ineffective. Thus, the pixel unit SP7 is locked due to the data signal on the data line D1, and the pixel unit SP10 is locked due to the data signal on the data line D2.

By this method of driving, the signals of the selected horizontal scan line and the following two adjacent horizontal scan lines are effective. During the second sub-period, the signals of the selected horizontal scan line and the following adjacent horizontal scan line are effective, and during the third sub-period, the selected horizontal scan line are effective. Therefore, accuracy of the display apparatus for loading data signals is improved.

Figure 7:
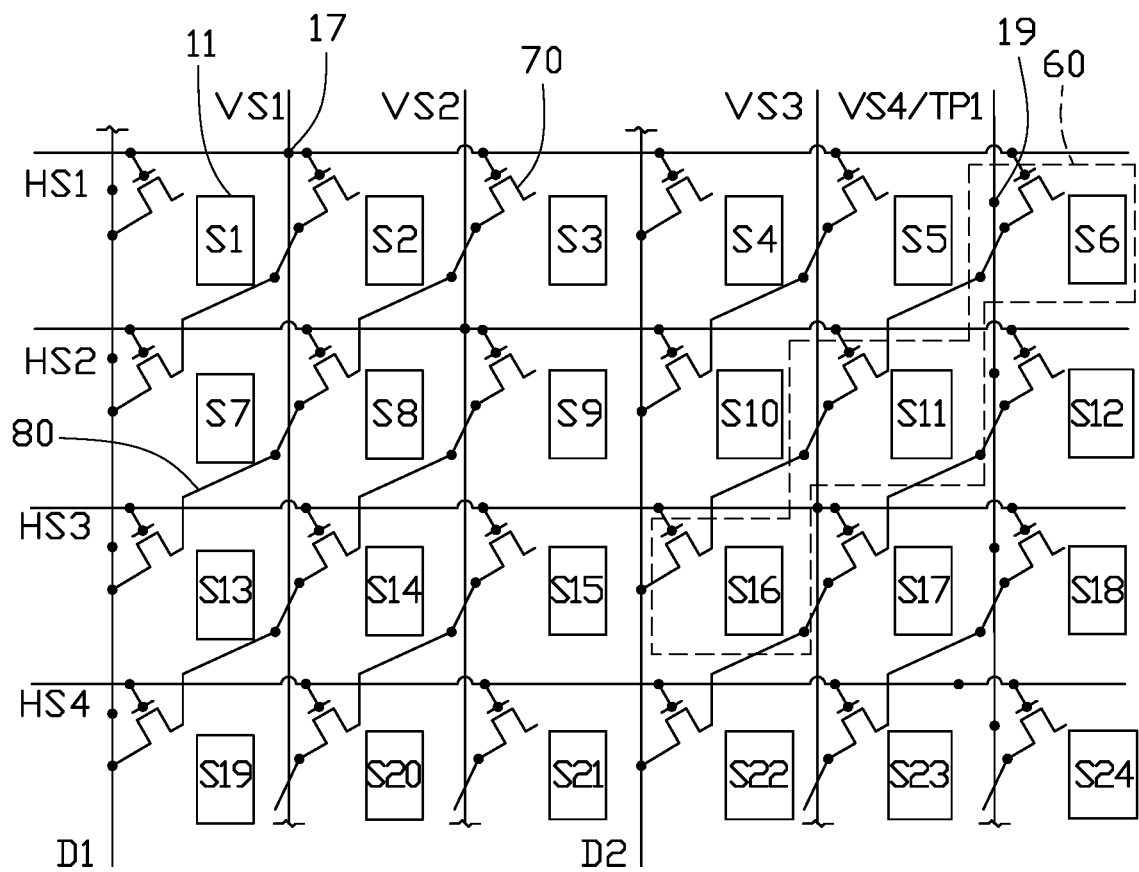
FIG. 7 is a circuit diagram of a second embodiment of a display apparatus.

FIG. 7 illustrates a second embodiment of a display apparatus (display apparatus 2). FIG. 7 only shows four vertical scan lines VS1-VS4, four horizontal scan lines HS1-HS4, two data lines D1-D2, and two touch sensing lines TS1-TS2. Twenty four pixel units SP1-SP24 are also defined. The display apparatus 2 is similar to the display apparatus 1. Elements in FIG. 7 with the same labels are the same as those in FIG. 2, and the electrical connections of the elements in FIG. 7 with the same labels are the same as those of the elements in FIG. 2. The difference between the display apparatus 2 and the display apparatus 1 is in the touch sensing lines TS1-TS2. In display apparatus 2, a number of the vertical scan lines VSi serve as the touch sensing lines TSi.

The display apparatus 2 includes a plurality of horizontal scan lines HS1-HSn, a plurality of vertical scan lines VS1-VSr, a plurality of data lines D1-Dm, and a plurality of touch sensing lines TS1-TSt. In this embodiment, n, r, m, t are positive integers each larger than 2. The vertical scan line VSi, insulated from the horizontal scan lines HS1-HSn, serves as the touch sensing line TSi. For example, the vertical scan line VS3 is electrically connected to the horizontal scan line HS3, and the vertical scan line VS4 which is insulated from the horizontal scan line HS4 serves as the touch sensing line TS1. The display apparatus 2 in a 1080*1920 resolution includes 1080*3 lines along the second direction Y. 1080 lines serve as the data lines D1-D1080, and 1920 lines serve as the vertical scan lines VS1-VS1920. The remainder of lines 240 serve as the touch sensing lines TS1-TS240.

Based on the structure described, three pixel units in one same pixel group are electrically connected to the same data line, thus a number of the data lines is reduced. The touch sensing lines, the vertical scan lines, and the data lines are patterned in a same layer, thus the masking operations during the fabricating process are reduced. The gate driver and control circuit are located on opposite edges, thus a narrow border of the display apparatus is obtained. Further, some of the vertical scan lines serve as the touch sensing lines, thus an aperture rate of the display apparatus is improved.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A driving method for driving a display apparatus, the display apparatus comprising a plurality of horizontal scan lines in a display region, and a plurality of data lines; in one frame time, a plurality of display periods and a plurality of touch periods are defined; each of the display periods comprises a plurality of selecting periods; each of the selecting periods comprises a first sub-period, a second sub-period and a third sub-period in listed order; the method comprising:

selecting one of the plurality of horizontal scan lines for scanning;

controlling signals of the selected horizontal scan line and two following horizontal lines adjacent to the selected horizontal scan line to be effective during the first sub-period;

controlling the signals of the selected horizontal scan line and a following horizontal scan line adjacent to the selected horizontal scan line to be effective during the second sub-period;

controlling the signal of the selected horizontal scan line to be effective during the third sub-period.

2. The driving method of claim 1, wherein the display apparatus comprises a plurality of pixel units arranged in a matrix; a plurality of pixel groups are defined; each pixel group comprises at least three pixel units; the pixel units in a same pixel group are arranged on different columns along the first direction, and further arranged on different rows along the second direction, the driving transistors of the pixel units in the same pixel group are electrically connected to a same data line through connection lines.

3. The driving method of claim 2, wherein the display region further comprises a plurality of vertical scan lines along the second direction; the vertical scan lines are patterned by a metal layer different from a metal layer patterned to form the horizontal scan lines, and are electrically connected to the horizontal scan lines respectively through a corresponding first via hole for transmitting scan signals to the horizontal scan lines.

4. The driving method of claim 2, wherein the display apparatus comprises a non-display region surrounding the display region; the non-display region comprises an upper edge and a bottom edge opposite to the upper edge, a gate driver is located in the upper edge, and a control circuit is located in the bottom edge.

5. The driving method of claim 3, wherein a number of the vertical scan lines is larger than a number of the horizontal scan lines; the vertical scan lines insulated from the horizontal scan lines serve as touch sensing lines for transmitting touch sensing signals.

6. The driving method of claim 2, wherein each pixel group comprises a first pixel unit, a second pixel unit, and a third pixel unit; in the same pixel group, a source electrode of the driving transistor in the first pixel unit is directly electrically connected to the corresponding data line; a source electrode of the driving transistor in the second pixel unit is electrically connected to a drain electrode of the driving transistor in the first pixel unit through one of the connection lines, and a drain electrode of the driving transistor in the second pixel unit is electrically connected to a source electrode of the driving transistor in the third pixel unit.

7. The driving method of claim 6, wherein the third pixel unit is locked due to a data signal on the corresponding connected data line during the first sub-period; the second pixel unit is locked due to a data signal on the corresponding connected data line during the second sub-period; the first pixel unit is locked due to a data signal of the corresponding connected data line during the third sub-period.

8. The driving method of claim 5, wherein the display region comprises a plurality of common electrodes; the common electrodes are arranged on a layer different from the layer where the touch sensing lines are arranged; the touch sensing lines are electrically connected to the common electrodes through second via holes.

9. The driving method of claim 4, wherein the non-display region further comprises a dummy pixel region; the dummy pixel region cooperates with the pixel units in the display region to form pixel groups.

* * * * *